March 7, 1950 C. H. HOOK 2,499,954
CLUTCH AND BRAKE MECHANISM
Filed June 30, 1944 5 Sheets-Sheet 3

INVENTOR
Charles Howard Hook
BY William B. Jaspert
ATTORNEY

March 7, 1950  C. H. HOOK  2,499,954
CLUTCH AND BRAKE MECHANISM
Filed June 30, 1944  5 Sheets-Sheet 4

INVENTOR
Charles Howard Hook
BY William B. Jaspert
ATTORNEY

March 7, 1950     C. H. HOOK     2,499,954
CLUTCH AND BRAKE MECHANISM

Filed June 30, 1944     5 Sheets-Sheet 5

INVENTOR
Charles Howard Hook
BY William B. Jaspert
ATTORNEY

Patented Mar. 7, 1950

2,499,954

UNITED STATES PATENT OFFICE 2,499,954

CLUTCH AND BRAKE MECHANISM

Charles Howard Hook, Pittsburgh, Pa.

Application June 30, 1944, Serial No. 543,040

9 Claims. (Cl. 192—12)

This invention relates to new and useful improvements in clutch mechanism for reciprocating presses or the like, and the present application is a continuation-in-part of my application serially numbered 493,524, filed July 5, 1943, which has matured in Patent No. 2,414,304, granted January 14, 1947, in which is disclosed mechanism for controlling the relative angular position of the complementary engaging surfaces for the clutching and declutching operations to prevent injury to the equipment and operators.

The present invention is an improvement of the clutch mechanism disclosed in the aforementioned application in that it is designed as a small, compact unit which may be operated in oil and which may be located between the flywheel and the press.

It is a further object of this invention to provide clutch mechanism in which the movable clutch element is sped up at the instance of declutching to eliminate drag on the faces of the clutching member and the invention particularly deals with the shape of a cam mechanism to control the point at which the complementary clutch elements are separated as they become disengaged to prevent breakage of the clutch tooth edges.

A further object of the invention is the provision of an inclined faced clutch tooth which is angularly displaced prior to declutching and which prevents accidental displacement of the clutch elements due to heavy load or shock.

A further object of the invention is to provide a clutch mechanism in which the movable clutch element constitutes an integral clutch sleeve, brake drum, declutching cam and over-travel stop.

A still further object of the invention is the provision of a clutch mechanism of the above designated character in which the declutching roller or knife switch operating mechanism coacts with a pair of brake members to preset the brakes which are released for engagement in response to rotation of the speed-up cam.

Still another object of the invention is the provision of means for displacing the cam followers out of register with the cams when the declutching roller or knife switch is moved out of engagement with the declutching cam.

Figure 1:
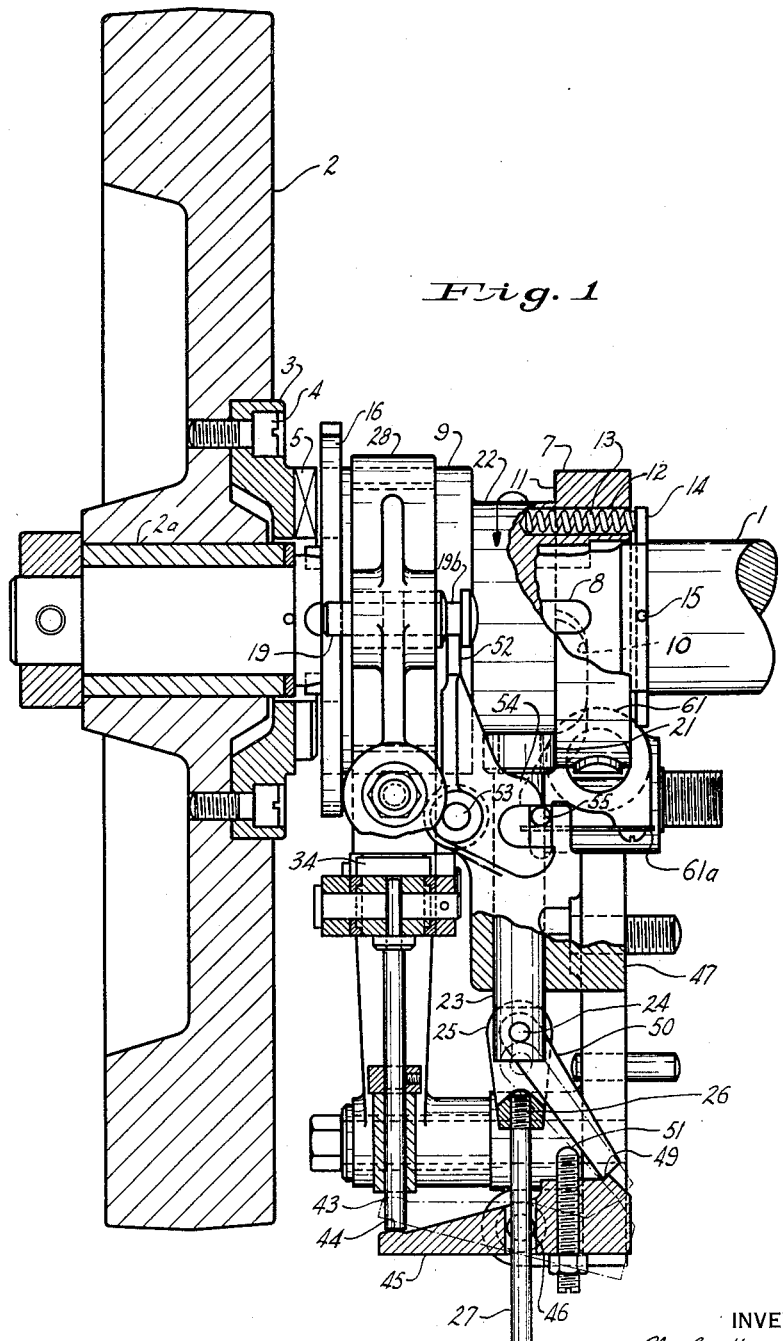
Figure 2:
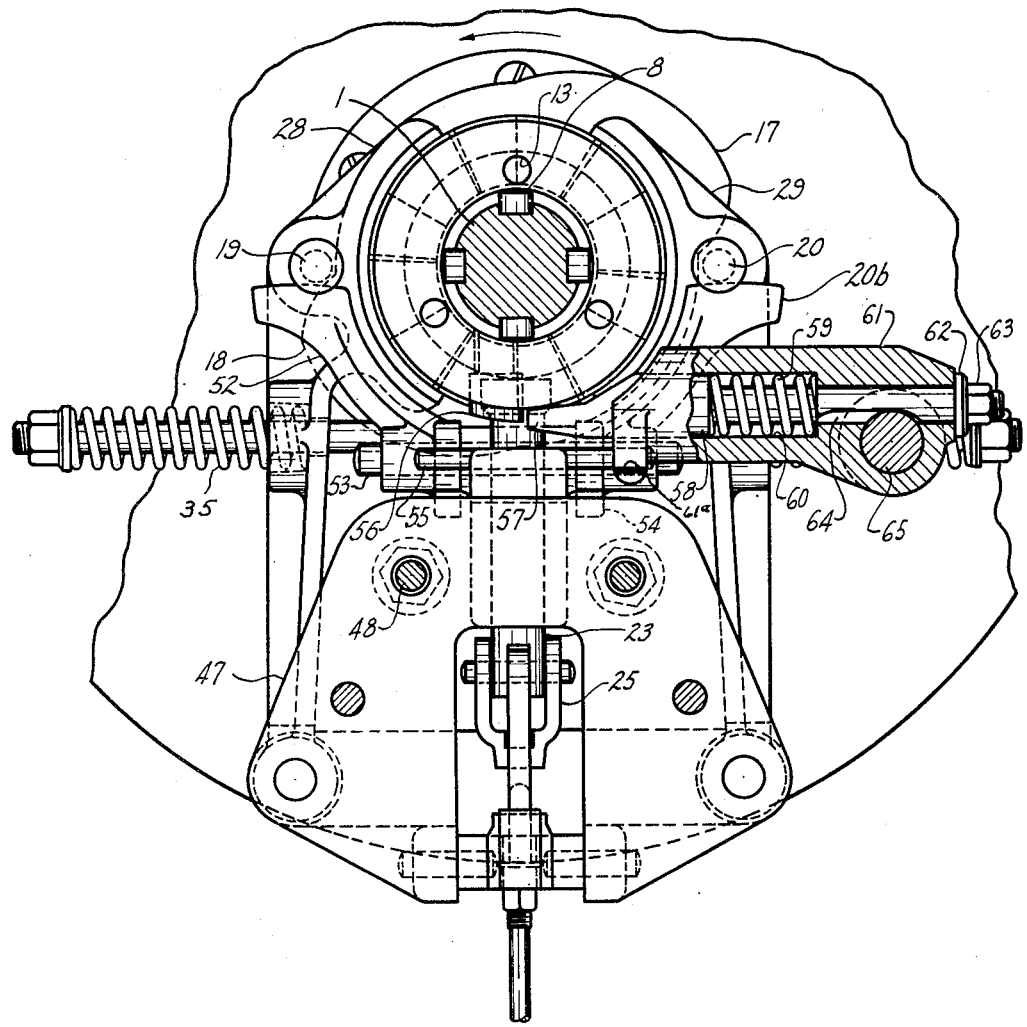
Figure 3:
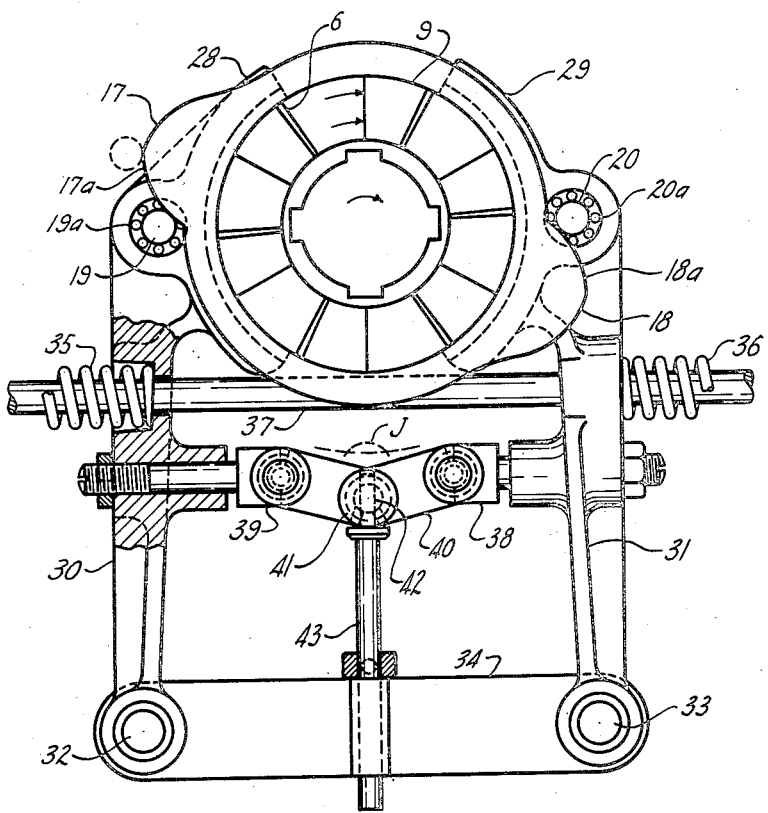
Figure 6:
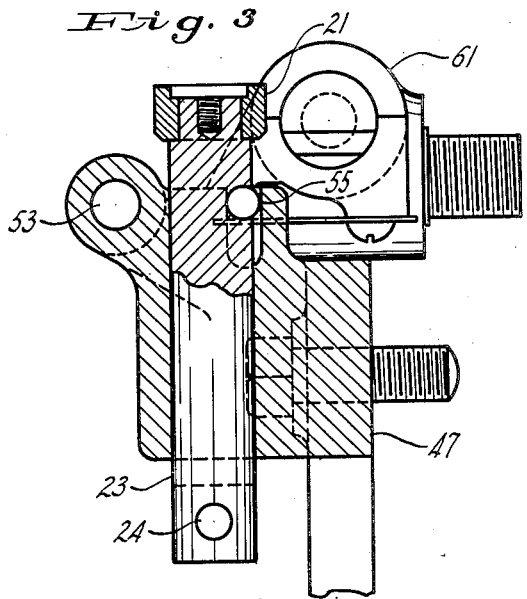
Figure 4:
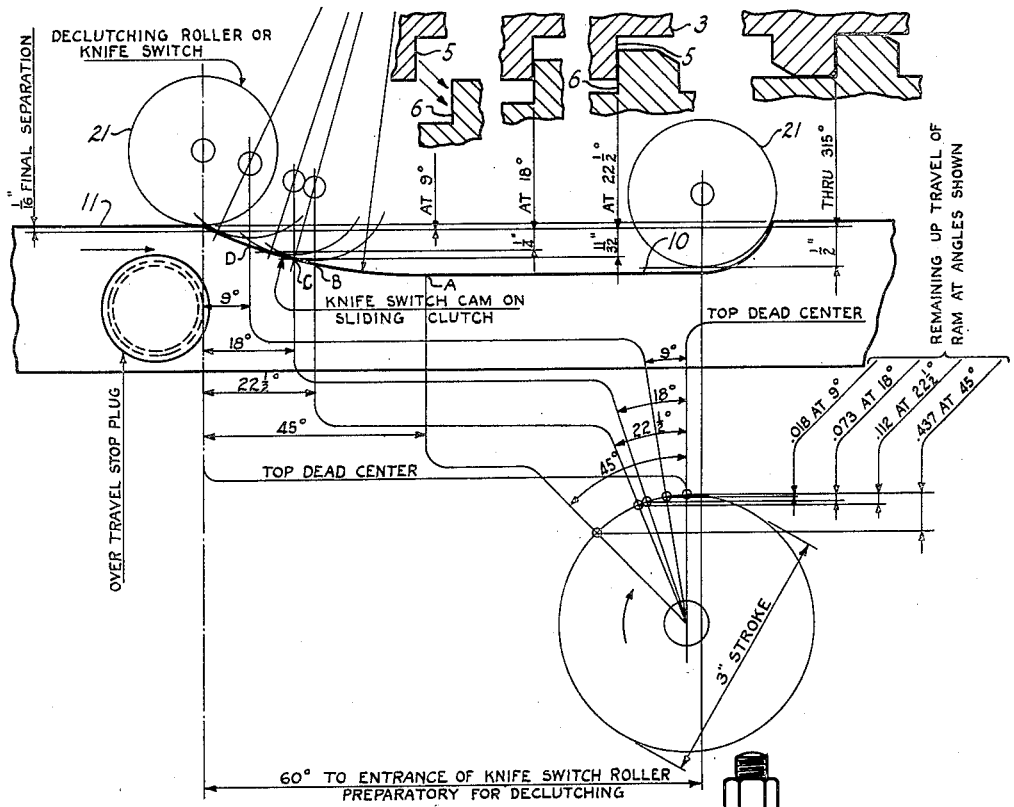
Figure 5:
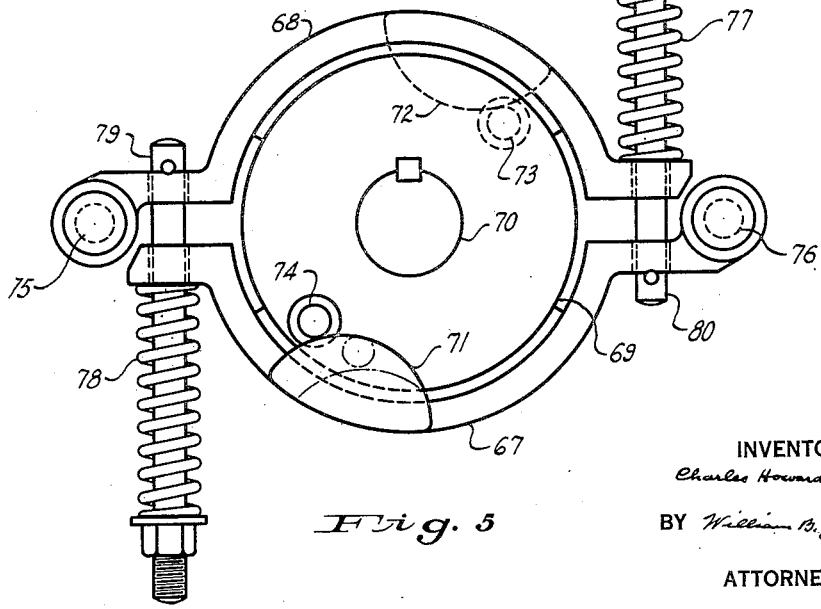
Figure 7:
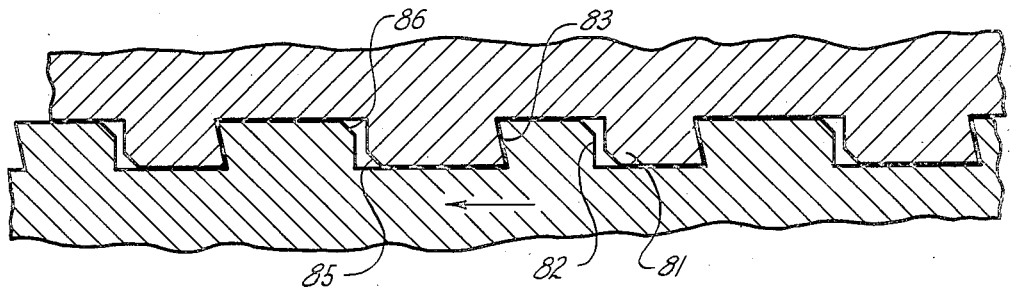
Figure 8:
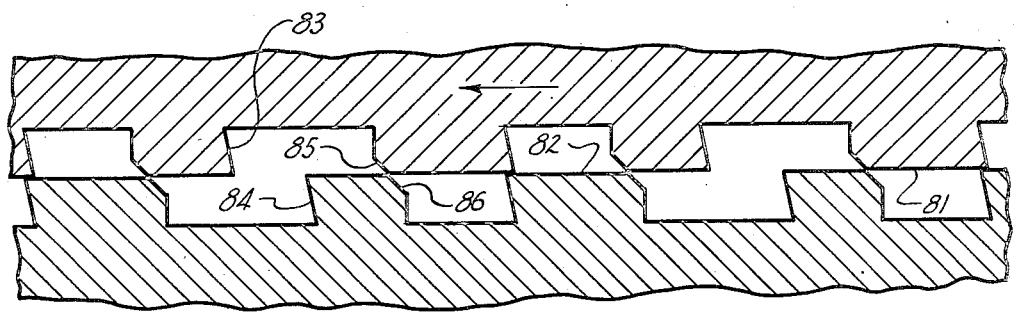

These and other objects of the invention will become more apparent from a consideration of the accompanying drawings constituting a part hereof, in which like reference characters designate like parts, and in which Fig. 1 is a vertical section, partially in elevation, of a clutch mechanism embodying the principles of this invention;

Fig. 2 an end elevational view thereof;

Fig. 3 an end elevational view of the clutch face and brake mechanism, partially in cross section;

Fig. 4 a diagrammatic view of the declutching cam and roller showing the relative position of the clutch teeth to said cam;

Fig. 5 an end elevational view of a modified form of speed-up cam and brake mechanism;

Fig. 6 a cross-sectional view of the declutching roller showing the end of the over-travel stop in elevation; and Figs. 7 and 8 diagrammatic views of specially shaped and spaced clutch teeth.

With reference to Fig. 1 of the drawings, the numeral 1 designates the crank shaft of a reciprocating press on which is mounted a flywheel 2 which is driven in any suitable manner, the crank shaft 1 being the driven element. The clutch member, generally designated by the numeral 3, is secured to the flywheel 2 by machine screws or bolts 4 and is provided with teeth 5 which are complementary in shape to the teeth 6 of the movable clutch element shown in Fig. 3. A clutch sleeve, generally designated by the numeral 7, is slidably mounted on keys 8 of the shaft 1, as is more clearly shown in Fig. 2, the clutch sleeve 7 having a brake drum 9 formed integrally thereon and having a declutching cam 10 in the face of the shoulder 11. The clutch sleeve 7 is normally biased in the direction of the teeth 5 of the clutch flywheel by coil springs 12 which are disposed in drill holes 13 provided in the clutch sleeve 7, which springs abut a spring back-up plate 14 secured to the crank shaft 1 by pins 15 or in any other suitable manner.

A cam 16 is mounted for rotation with the sliding clutch 7 and is provided with cam faces 17 and 18, Figs. 2 and 3, which are diametrically opposed and which are provided with a drop 17a and 18a, the curvature of which is such as to provide a varying pressure angle which is of maximum dimension at the crest of the cam, gradually reducing to a minimum so that the cam followers designated by the numerals 19 and 20 assert a substantially uniform pressure on the cam face in its travel from the crest to the bottom of the drop, for a purpose to be hereinafter explained.

Movement of the clutch sleeve 7 is controlled by a clutch roller 21 which is disposed in the groove 22 of the clutch sleeve. The roller is mounted on a plunger 23 pivotally connected at 24 to a yoke 25 which has a threaded connection at 26 with a foot pedal operating rod 27.

Brake shoes 28 and 29, comprising a sectional brake, are disposed around the brake drum 9 of the clutch sleeve and are provided with arms 30 and 31, respectively, pivoted at 32 and 33 to a cross yoke 34. Brake arms 30 and 31 are biased by coil springs 35 and 36 disposed on a guide rod 37 in the direction to normally engage the brake drum 9. Brake arms 30 and 31 are actuated to separate against the compression of springs 35 and 36 by a toggle mechanism comprising studs 38 and 39 on which are pivotally mounted links 40 and 41, the other ends of which are pivoted at 42 to a push rod 43, the end of which abuts the face 44 of a lever 45 that is pivoted at 46 to a bracket 47 that is bolted by bolts 48, Fig. 2, to the side frame of the machine, not shown. Lever 45 is provided with a notch 49, Fig. 1, that is engaged by a lever 50 pivoted by the pin 24 to the declutch follower plunger 23. A stop 51 extended through an opening in lever 45 is provided with a rounded end for engaging lever 50 to kick it out of the notch 49 for a purpose to be hereinafter explained.

The brake shoes 28 and 29 carry the cam followers 19 and 20 which are mounted in roller bearings 19a and 20a as shown in Fig. 3. These followers are provided with grooves 19b, Fig. 1, which are engaged by a yoke 20b of a bell crank lever 52 pivoted at 53 to the bracket 47, the other end of the lever constituting a bifurcated member 54 which engages a pin 55 that is carried by the declutch roller plunger 23 and is subject to movement whereby, when the foot pedal is depressed moving pin 55 downward, the bell crank lever 52 will move the cam followers out of register with the cam faces 17 and 18.

As shown in Fig. 2, the clutch sleeve 7 is provided with a lug 56 which coacts with the chamfered end 57 of a plunger 58 which is biased by a coil spring 59 disposed in a cylindrical recess 60 of a bracket 61. Bracket 61 is provided with a flat spring 61a, Fig. 1, which is disposed around the pin 55 to be movable with the clutch cam plunger 23 so that when the foot pedal is moved downward the bracket 61 and plunger 58 will be displaced out of alinement with the lug 56 in the clutch sleeve. The plunger 58 constitutes an over-travel stop which positively locks the driven element when the cranks of shaft 1 are in their raised position.

The plunger 58 is provided with a collar 62 and nut 63 in the opposite end and is further provided with a slot 64 which engages a key 65 that is screwed in the side of the machine, the key maintaining proper alinement of the chamfered end 57 of the plunger with the lug 56 of the clutch sleeve 7.

A modified form of brake shoe and speed-up cam mechanism is shown in Fig. 5 of the drawings and consists of brake shoes 67 and 68 cooperating with a brake drum 69 mounted on the crank shaft 70. The shoes carry cams 71 and 72 which cooperate with followers 73 and 74 that rotate with the drive member. The brake shoes are pivoted at 75 and 76 and are biased by coil springs 77 and 78 disposed around pins 79 and 80 extending through openings in the respective ends of the brake shoe arms.

The operation of the clutch mechanism will now be described in connection with Figs. 1 to 4 inclusive of the drawings.

As is well known in the art, reciprocating presses are provided with slides that are connected by pitmans to the crank of the shaft 1. These slides carry either cutting shears or forming dies or other work performing implements (not shown) which strike or act upon the work on the downward travel of the slide. Reciprocating presses may be operated continuously or intermittently, depending upon the nature of the work, and the continuous or intermittent operation is controlled by the operator by depressing the foot pedal. If the pedal is released when the operation has been initiated, the slide will operate through one cycle and travel downwardly and upwardly at which point the crank shaft is stopped. For continuous operation the operator merely retains his foot on the foot pedal to keep the sleeve declutching roller out of the path of the cam. This function is common to all reciprocating presses and is mentioned for the purpose of demonstrating features of the present invention which render some of the parts, such as roller 21 and followers 19 and 20, inoperative when the press functions continuously.

Assuming the drive wheel 2, which is journaled on shaft 1 on bearings 2a, to be rotating and the clutch teeth 5 and 6 out of engagement with the clutch sleeve 7 in the position shown in Fig. 1; when the operator depresses the foot pedal which pulls the rod 27 in a downward direction the clutch follower 21 will be moved downwardly out of the recess 22 and the clutch sleeve 7, which is biased by the coil springs 13, will move axially to the left on the crank shaft 1, as viewed in Fig. 1, to effect clutching engagement of teeth 5 and 6 which drives the crank shaft 1 in the direction shown by arrows in Figs. 1 and 2. When the clutching cam face 10, which as shown by dotted lines in Fig. 1 is a recess in the face 11 of the clutch sleeve 7, registers with the declutching roller 21, the latter will fall into the recess in engagement with the cam face 10. This is shown diagrammatically in Fig. 4 and is the point at which the roller 21 is at the right-hand end of the cam face 10. As the foot pedal is depressed, lever 50, which is in engagement with the notch 49 of lever 45, depresses the lever and raises the end face 44 into engagement with the toggle plunger 43 and moves the toggle links to the position shown by the dotted lines in Fig. 3 and designated by reference character J. The stop 51 kicks out lever 50 when the togggle links have been set. As previously explained, downward movement of the cam follower plunger 23 displaces lever 52 which moves the cam followers 19 and 20 out of alinement with the speed-up cams 17 and 18 and also displaces the bracket 61 by pin 55 acting to move the over-travel stop plunger out of alinement with the lug 56 of the clutch sleeve 7. If the slide is to be subjected to a single cycle of operation the operator removes his foot from the pedal, allowing the declutch cam follower 21 to ride on the flange of the clutch sleeve designated by the numeral 7 in Fig. 1 until the clutch cam 10 registers with the follower 21 permitting it to drop into the recess 10 as shown in Fig. 4 of the drawings. Upon further rotation of the crank shaft, follower 21 will travel the length of the cam face 10 to displace the clutch sleeve in the manner shown diagrammatically in Fig. 4, gradually displacing the sleeve until complete disengagement of the clutch teeth is effected when the follower 21 abuts the face 11 of the clutch sleeve.

The separation of the clutch sleeve and clutch teeth is diagrammatically shown in four views in Fig. 4, the first view to the right illustrating complete clutch tooth engagement and the successive views illustrating varying degrees of tooth separation. As shown by the guide lines there is complete tooth engagement when the follower 21 is at point A on the cam face. On the up-travel of the slide, when the crank shaft 1 has rotated 315° the follower 21, which as previously explained is riding on the face designated by the numeral 7, Fig. 1, in alinement with cam 10, will drop into engagement with the cam face and be at point A when the crank shaft still has 45° of movement before the slide and crank reach top dead center. The next point marked off on the crank shaft 1 in Fig. 4 is movement through an angle of 22½° when the follower 21 is at point B on the declutch cam 10. At this point there has been a slight separation of clutch teeth 5 and 6 as shown. If the depth of the clutch tooth is ½", the separation at point B would be 5/32nds of an inch, leaving 11/32nds of contact area. At point C of travel of the follower on the cam 10, which is at 18° of travel on the crank shaft to top dead center, there is a further separation to the point of ¼" of contact of the clutch teeth, and when the follower reaches point D on the cam 10, which is at the final 9° of travel of the crank shaft to dead center, the teeth have been separated completely, leaving, however, further separation to provide a clearance space for the final 9° of travel of the crank shaft.

It is to be noted by the double arrow designating the space between the clutch teeth at 9° of separation that not only are the clutch members separated, but the teeth have been angularly displaced. This displacement is effected by the speed-up cams 17 and 18 as will now be described.

During rotation of the cams 17 and 18, Fig. 3, the followers were being displaced in a radial direction against the compression of springs 35 and 36, thus loading the springs. In the position viewed in Fig. 3 the rise of cam 18 was moving in the direction of the toggle which, as previously explained, is in the dotted line position J, and as the toggle joint becomes straight and passes the straight line, the brake arms snap on drum 9.

As the cam followers 19 and 20 engage the rise of the cams 17 and 18, the brake arms 30 and 31 are separated, disengaging the brakes from the drum. At the time the followers are on the crest of the cam, as shown in Fig. 3, the brakes are completely released and the full force of compression of springs 35 and 36 acts on the followers to displace the cams in the direction of their rotation at a speed greater than the speed of the crank shaft.

As previously explained, the faces 17a and 18a of the speed-up cams may be of such curvature that the pressure angle at the beginning of the drop is the greatest and is a minimum at the end of the drop, the curve being such that there will be substantially uniform accelerating force exerted by the followers on the cam face to speed up the crank shaft during the entire traverse of the followers on the declining cam face. In other words, the maximum load at maximum pressure angle exists when the springs 35 and 36 have their maximum capacity, and as the spring load decreases the pressure angle decreases on the drop of the cam face which provides a greater impulse to speed up the crank shaft.

The angular relation of the speed-up cam faces 17 and 18 and the cam face 10 of the declutching mechanism is so related that there will be a speed up causing angular displacement of the clutch teeth 5 and 6 prior to complete separation of the teeth by the declutching followers 21, as illustrated in the diagram, Fig. 4 of the drawings.

As illustrated in Figs. 7 and 8 of the drawings, the clutch teeth 81 and 82 may be of different sizes with correspondingly sized notches and the load bearing faces 83 and 84 of the teeth may be at an angle less than 45°, while the opposite face of the teeth may be chamfered as shown at 85 and 86.

If in the engagement of the clutch faces the large teeth and small teeth do not register with their respective notches, the clutch faces will slide until the teeth drop into their respective notches to effect working or clutching engagement. The purpose of the odd-tooth construction is to prevent direct clutching engagement to thereby prevent breakage of the tooth edges when they clash.

By the law of averages such direct clutching engagement may be effected once in 10,000 or more times of contact, so that substantially in all cases the clutch faces will engage and be subjected to some sliding movement before the teeth register with their corresponding notches and effect clutching engagement therewith.

By the use of the hooked or angular faces 83 and 84 of the clutch teeth, the teeth will not jar out of engagement during heavy work strokes of the press and weaker springs may be used to bias the sliding clutch into driving engagement. This is desirable because the sliding clutch springs have to be counteracted by the brake shoe springs 35 and 36 and 77 and 78 that bias the brake shoe rollers over the curve of the speed-up cams. The use of the hooked clutch teeth is possible only where, as here, the driven element is speeded up before separation of the clutch members, as is illustrated in the diagram view of Fig. 4 by the double arrows.

In the modified form of combined brake shoe and speed-up cam shown in Fig. 5, the curvature of the cam faces 71 and 72 is such that the maximum speed-up force of the springs 77 and 78 is available at maximum pressure angle. In this form of the device the followers 73 and 74 rotate with the crank shaft 70 and the cams are carried by the brake shoes and remain stationary against rotation.

It is evident from the foregoing description of this invention that clutch mechanism made in accordance therewith operates to speed up the driven element or crank shaft at the crest of its up-travel, at which instance the brake load is removed from the driven member, thereby eliminating wear on the clutch teeth. Other shapes of the speed cams will produce corresponding changes in the rate of speed-up at the different positions of the speed-up followers. It is also evident that by means of such mechanism there can be no accidental engagement of the clutch teeth causing injury to the operator. It is further apparent that the clutch mechanism is of compact design and may be disposed between the flywheel and the machine housing and operated in oil to further reduce wear.

In addition to the brake stop which is disengaged during the speed-up travel of the driven member, the over-travel stop 57 engaging the lug 56 brings the slide and crank shaft to a positive stop when the reciprocating slide has reached the top of its return stroke, and is not again released until the operator depresses the foot pedal. The release of the over-travel stop, as described, is coordinated with the declutch roller 21 so that there can be no clutching engagement without first displacing the over-travel stop.

Although several embodiments of the invention have been herein illustrated and described, it will be evident to those skilled in the art that various modifications may be made in the details of construction without departing from the principles herein set forth.

I claim:

1. In a clutch mechanism for reciprocating presses and the like, a drive clutch member and a driven clutch member having interacting teeth, said teeth having parallel abutting faces of substantial contact area and having engaging faces which are inclined at an angle less than 45° to the clutch axis to interlock the teeth when in clutching engagement, a speed-up mechanism mounted on the driven clutch member for rotation therewith and declutching mechanism connected to said driven clutch member for separating the coacting clutch members, and means coordinating said speed-up and declutching mechanisms to separate said inclined clutch teeth preliminary to the declutching movement of said driven member.

2. In a clutch mechanism for reciprocating presses and the like, a drive clutch member and a driven clutch member element having cooperating gear teeth on their juxtaposed faces alternately varying in size, the driving faces of said teeth being inclined at an angle of less than 45° to the clutch axis for interlocking the clutch elements against accidental displacement, and the trailing faces of said teeth being chamfered to facilitate meshing engagement of said teeth and means for speeding up one of said clutch elements to clear the inclined interlocking faces preliminary to relative declutching movement of said clutch members and means for separating said clutch members.

3. In a clutch mechanism for reciprocating presses and the like, a drive clutch member and a driven clutch member, the latter comprising an integral sleeve mounted for axial movement relative to the drive clutch member, having clutch teeth on one face thereof and having a declutching cam on another face thereof, said sleeve being normally biased by springs for movement in the direction of the drive clutch member, a surface of said sleeve constituting a brake drum, brake elements cooperating with said brake drum surface, and means for actuating said brake to engage and disengage said clutch sleeve brake surface, a declutch roller for engaging the declutching face of said sleeve, means for moving said roller into and out of alinement with said declutch cam, said last-named means including means for setting said brakes to render them operative for engaging the clutch sleeve drum surface when said declutch roller has effected disengagement of the clutch members.

4. In a clutch mechanism for reciprocating presses and the like, a brake therefor comprising a brake drum rotatable with said clutch mechanism, a plurality of brake shoes for engaging said drum, said brake shoes being mounted on brake arms connected by a toggle lever which in one position separates the brake shoes out of contact with said drum and in its collapsed position permits engagement of said shoes with said drum, said clutch mechanism having a cam rotatable in the path of travel of said toggle lever for engaging said lever to break the same for effecting engagement of the shoes with said drum.

5. In a clutch mechanism for reciprocating presses and the like, a brake therefor comprising a brake drum rotatable with said clutch mechanism, a plurality of brake shoes for engaging said drum, said brake shoes being mounted on brake arms connected by a toggle lever which in one position separates the brake shoes out of contact with said drum and in its collapsed position permits engagement of said shoes with said drum, said clutch mechanism having a cam and said brake shoes having a cam follower for engaging said cam, and means for exerting a yielding pressure against said brake shoes whereby the cam follower exerts pressure on the cam face to speed up one of said clutch members.

6. In a clutch mechanism for reciprocating presses and the like, a brake therefor comprising a brake drum rotatable with said clutch mechanism, a plurality of brake shoes for engaging said drum, said brake shoes being mounted on brake arms connected by a toggle lever which in one position separates the brake shoes out of contact with said drum and in its collapsed position permits engagement of said shoes with said drum, said clutch mechanism having a cam and said brake shoes having a cam follower for engaging said cam, and means for exerting a yielding pressure against said brake shoes whereby the cam follower exerts pressure on the cam face to speed up one of said clutch members, said cam face being of a curvature to provide a maximum pressure angle between the follower and the cam at the crest or rise of the cam and a gradually decreasing pressure angle throughout the drop of the cam, whereby a uniform thrust is exerted by the follower on the cam face throughout its travel along said speed-up cam surface.

7. In a clutch mechanism for reciprocating presses and the like, a drive clutch member and a driven clutch member, said driven clutch member being integrally formed on a clutch sleeve normally biased in the direction of engagement with the drive clutch member and having a declutch mechanism for separating said clutch elements, an abutment on said sleeve constituting an over-travel stop and a cooperating abutment adapted for movement into and out of alinement with said sleeve abutment, and means connecting said stop with said declutch mechanism to bring it in register with the sleeve abutment when declutching has been completed.

8. In a clutch mechanism for reciprocating presses and the like, a drive clutch member and a driven clutch member, the latter comprising a sleeve movable for clutching and declutching engagement with the drive clutch member, said sleeve having a brake drum and an over-travel stop, brake shoes mounted for engagement with said drum, a stop adapted for movement into and out of the path of the over-travel stop, a declutch mechanism, manually operable means for actuating said declutch mechanism, and means operative by said declutch mechanism for closing and separating the brakes of said drum and for moving said over-travel stop into and out of register with its abutting surface on the clutch sleeve.

9. A clutch mechanism for reciprocating presses and the like comprising a drive clutch member and a driven clutch member, said driven clutch member consisting of a sleeve mounted for axial movement on the driven shaft and having mounted thereon a brake drum, a speed-up cam, declutch cam and over-travel stop, followers for said speed-up cam, and a declutching follower for said declutch cam, said followers being interconnected to be operative for simultaneously disengaging said followers from their respective cams, and a movable stop adapted to coact with the over-travel stop of said sleeve interconnected with said cam follower actuating mechanism for movement into and out of alinement with said over-travel stop.

CHARLES HOWARD HOOK.

REFERENCES CITED

The following references are of record in the file of this patent:

UNITED STATES PATENTS

| Number | Name | Date |
| --- | --- | --- |
| 1,709,585 | Lansing | Apr. 16, 1929 |
| 1,773,107 | Lansing | Aug. 19, 1930 |
| 2,080,544 | Maugler | May 18, 1937 |
| 2,340,416 | Eason | Feb. 1, 1944 |
| 2,414,304 | Hook | Jan. 14, 1947 |

FOREIGN PATENTS

| Number | Country | Date |
| --- | --- | --- |
| 122,348 | Great Britain | Jan. 23, 1919 |
| 313,785 | Italy | Jan. 5, 1934 |
| 436,232 | Germany | Nov. 30, 1926 |
| 506,740 | Germany | Sept. 8, 1930 |